(12) United States Patent
Kushnirskiy

(10) Patent No.: US 7,464,382 B1
(45) Date of Patent: Dec. 9, 2008

(54) UI AWARE METHOD INVOCATION TRANSFERRING TO JAVA EVENT DISPATCH THREAD

(75) Inventor: Igor D. Kushnirskiy, Ithaca, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 624 days.

(21) Appl. No.: 11/054,058

(22) Filed: Feb. 8, 2005

Related U.S. Application Data

(60) Provisional application No. 60/582,871, filed on Jun. 25, 2004.

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/314; 719/320

(58) Field of Classification Search ......... 719/311–320, 719/328–332; 710/39, 54
See application file for complete search history.

(56) References Cited

U.S. PATENT DOCUMENTS

| | | | | |
|---|---|---|---|---|
| 5,555,415 | A * | 9/1996 | Allen ......................... | 719/318 |
| 5,664,148 | A * | 9/1997 | Mulla et al. ................. | 711/138 |
| 5,727,214 | A * | 3/1998 | Allen ......................... | 719/318 |
| 5,828,882 | A * | 10/1998 | Hinckley ..................... | 719/318 |
| 6,829,771 | B1 * | 12/2004 | Bahrs et al. .................. | 719/318 |
| 6,842,792 | B2 * | 1/2005 | Johnson et al. ................ | 710/5 |
| 6,981,047 | B2 * | 12/2005 | Hanson et al. ............... | 709/227 |
| 2002/0128897 | A1 | 9/2002 | Nelson et al. | |
| 2003/0115375 | A1 * | 6/2003 | Robison ...................... | 709/318 |
| 2004/0003144 | A1 * | 1/2004 | Johnson et al. ................ | 710/5 |
| 2004/0230989 | A1 * | 11/2004 | Macey et al. .................. | 725/24 |
| 2004/0243374 | A1 | 12/2004 | Kundert | |
| 2005/0097569 | A1 * | 5/2005 | Chandrasekaran .......... | 719/318 |

OTHER PUBLICATIONS

*Java.awt Class EventQueue*, Java™ 2 Platform Standard Ed. 5.0, http://java.sun.com/j2se/1.5.0/docs/api/java/awt/EventQueue.html Downloaded Jan. 20, 2005, pp. 1-7.
*Interface Future<V>*, Java™ 2 Platform Standard Ed. 5.0, http://java.sun.com/j2se/1.5.0/docs/api/java/util/concurrent/Future.html Dowloaded Jan. 26, 2005, pp. 1-4.

(Continued)

*Primary Examiner*—Meng-Ai An
*Assistant Examiner*—Diem K Cao
(74) *Attorney, Agent, or Firm*—Dosrey & Whitney LLP

(57) ABSTRACT

Methods and apparatuses are disclosed for transferring a method call from an invoke thread to an event dispatch thread. The invoke thread and the event dispatch thread may execute independent of one another and the event dispatch thread may have an associated queue. The method may include defining a new call on the invoke thread. The new call may include identification of a method, identification of an object, one or more arguments, and a coalescing indicator indicating a type of coalescing for the call. The method may further include sending, during execution of the invoke thread, the new call to the queue, one or more previous calls being stored in the queue, and coalescing the new call with one of the previous calls in the queue according to the type of coalescing indicated by the coalescing indicator.

20 Claims, 9 Drawing Sheets

OTHER PUBLICATIONS

*Threads and Swing*, http://java.sun.com/products/jfc/tsc/articles/threads/threads1.html Downloaded Jan. 20, 2005, pp. 1-8.
*Spin your Swing.*, http://spin.sourceforge.net/ Downloaded Jun. 24, 2004, pp. 1-8.
*Project: Foxtrot: Summary*, http://sourceforge.net/projects/foxtrot/ Downloaded Jun. 24, 2004, pp. 1-3.
*Import javax.swing.SwingUtilities;*, http://java.sun.com/products/jfc/tsc/articles/threads/src/SwingWorker.java Downloaded Jun. 24, 2004, pp. 1-3.

Non-Final Office Action, U.S. Appl. No. 11/054,586, 21 pages, Jan. 10, 2008.
Amendment and Response to Non-Final Office Action, U.S. Appl. No. 11/054,586, 19 pages, Apr. 10, 2008.
Final Office Action, U.S. Appl. No. 11/054,586, 20 pages, Aug. 1, 2008.
Amendment and Response to Final Office Action, U.S. Appl. No. 11/054,586, 15 pages, Nov. 4, 2008.

* cited by examiner

FIG. 7

UI AWARE METHOD INVOCATION TRANSFERRING TO JAVA EVENT DISPATCH THREAD

REFERENCE TO EARLIER-FILED APPLICATION

This application claims benefit of priority from U.S. Provisional Patent Application No. 60/582,871, filed Jun. 25, 2004, for SWINGWORKER FRAMEWORK FOR LENGTHY JAVA SWING/JFC INTERACTING TASKS, which is hereby incorporated by reference.

CROSS-REFERENCE TO RELATED APPLICATION

This application relates to commonly assigned, copending U.S. patent application Ser. No. 11/054,586, filed concurrently herewith, for FRAMEWORK FOR LENGTHY JAVA SWING INTERACTING TASKS, which is hereby incorporated by reference.

FIELD

The present invention relates to the sending of method invocations to a Java event dispatch thread from outside the event dispatch thread.

BACKGROUND

The Java 2 Platform Standard Edition (J2SE) and the Java Development Kit (JDK) provide developers with access to a wide range of user interface (UI) and graphical user interface (GUI) components. The JDK provides flexibility and control over the appearance of UIs and GUIs.

Conventional graphics toolkits, such as the Abstract Windowing Toolkit (AWT), provide application programming interfaces (APIs) for applications. The Java Foundation Classes (JFC), also commonly referred to as "Swing" or the "Swing toolkit," are a set of Java class libraries having components that build upon the AWT by providing additional UI and GUI components and services. The Swing toolkit incorporates the AWT and is included in the JDK and J2SE to provide a rich, extensible GUI component library. The Swing toolkit is implemented in the Java programming language, and enables building of applications with GUIs and graphics functionality that can run on any platform supporting the J2SE, such as Microsoft Windows, Linux, and Mac OS X.

The Swing toolkit includes categories of components: atomic controls, complex data components, text components, menu components, layout containers and top-level window components. Examples of Swing components include buttons, panels, listboxes and checkboxes. In addition to the new components, the Swing toolkit offers a customizable look and feel that allows the components to take on the appearance of various windowing systems, or their own unique look and feel. For instance, Swing allows applications to easily convert from a "Java look and feel" to a "Windows look and feel." Developers have the ability to create their own look and feel for custom applications. Regardless of the desired look and feel, a consistent API can be maintained for the component. Thus, developers can code their application GUI once and run it in multiple look and feels.

Swing is not designed for multi-threading. Access to a Swing component or class has to occur from a single thread, specifically an event dispatch thread (EDT). Thus, once a Swing component has been realized (e.g., when the component's "paint" method has been called), all code that might affect or depend on the state of that component should be executed on the EDT. The EDT is responsible for processing all UI and GUI related events, such as user interactions (e.g., mouse clicks, key presses), notification of listeners of user input, and all painting and graphics including repainting dirty regions or updated areas. Essentially every instruction to change something or request something from the Swing component is executed as an event on the EDT.

The EDT handles many different events, as described above. At the EDT, all of the events or tasks are queued and processed sequentially. Problems can occur when too many events are queued. If one event takes a long time to process on the EDT, such as loading an HTML page, all of the other events in the queue will have to wait to be processed. This waiting or delay is undesirable. It is generally perceived as the entire UI and application itself being unresponsive, often referred to as "freezing" or "blocking."

Conventional techniques for attempting to reduce freezing or blocking include two Swing utilities. These Swing utilities are java.awt.EventQueue.invokeLater, used for asynchronous method calls, and java.awt.EventQueue.invokeandWait for synchronous calls. However, the methods java.awt.EventQueue.invokeLater and java.awt.EventQueue.invokeandWait create runnable classes for every call to those methods. Each runnable class is executed as a separate event on the EDT. Creating new runnable classes for every call is computationally expensive, and often results in the same freezing or blocking problem described above when many runnable classes are passed to the EDT.

Efficient techniques are needed for accessing Swing components from outside of the EDT, including calling methods requiring execution of events on the EDT from outside of the EDT.

SUMMARY

Aspects of the present invention include methods and apparatus, including computer program products, implementing and using techniques for accessing Swing components from outside an event dispatch thread (EDT). Aspects of the present invention provide for efficient execution of events on the EDT responsive to method calls from outside of the EDT.

According to some aspects of the present invention, methods and apparatus provide for efficient transfer of method calls from one thread, such as an invoke thread, to the EDT. The invoke thread and the EDT execute independently of one another. The disclosed techniques for transferring executing code avoid the unnecessary queuing of events on the EDT. Method calls are coalesced for execution on the EDT, preventing the EDT from being overwhelmed.

According to one aspect of the present invention, a new call is defined on the invoke thread. The new call includes identification of a method, identification of an object, one or more arguments, and a coalescing indicator indicating a type of coalescing for the call. During execution of the invoke thread, the new call is sent to a queue, where one or more previous calls are stored. The new call is coalesced with one or more of the previous calls in the queue according to the type of coalescing indicated by the coalescing indicator. Calls are retrieved from the queue and executed in sequence as events on the EDT.

The foregoing, along with other methods of aspects of the present invention, may be implemented in software, firmware, hardware and combinations thereof. For example, methods of aspects of the present invention may be implemented by computer programs embodied in machine-readable media and other products. These and other features and benefits of aspects of the invention will be described in more detail below with reference to the associated drawings.

BRIEF DESCRIPTION OF THE FIGURES

FIG. 7 shows a graphical user interface updated using a method for sending method calls to an event dispatch thread, according to one embodiment of the present invention.

In the Figs., like reference symbols in the various drawings indicate like elements.

DETAILED DESCRIPTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

Embodiments of the present invention provide methods and apparatus, including computer program products, implementing efficient techniques for accessing Swing components from outside an event dispatch thread (EDT). Embodiments of the methods and apparatus described herein provide efficient execution of events on the EDT responsive to method calls from outside of the EDT and, in some embodiments, interaction with the EDT to execute lengthy tasks.

Methods performed in accordance with embodiments of the invention provide efficient transfer of methods from one thread to another thread. Such transfer of executing code avoids the unnecessary queuing of events on the EDT, thus minimizing and often eliminating the freezing or blocking phenomenon. In some embodiments, the present invention provides coalescing of method calls for execution on the EDT, preventing the EDT from being overwhelmed.

Embodiments of methods and apparatus of the present invention provide the capability of coalescing method calls on the EDT. "Coalescing" refers to merging two or more calls into one to be executed on the EDT. An example of coalescing is provided by the Consume method, described below, in which arguments are combined when the same method is called for the same object. Other types of coalescing are described below. Calls coalescing for the Consume method and the setProgress method, described below, improve application performance and the UI response time.

Figure 1:
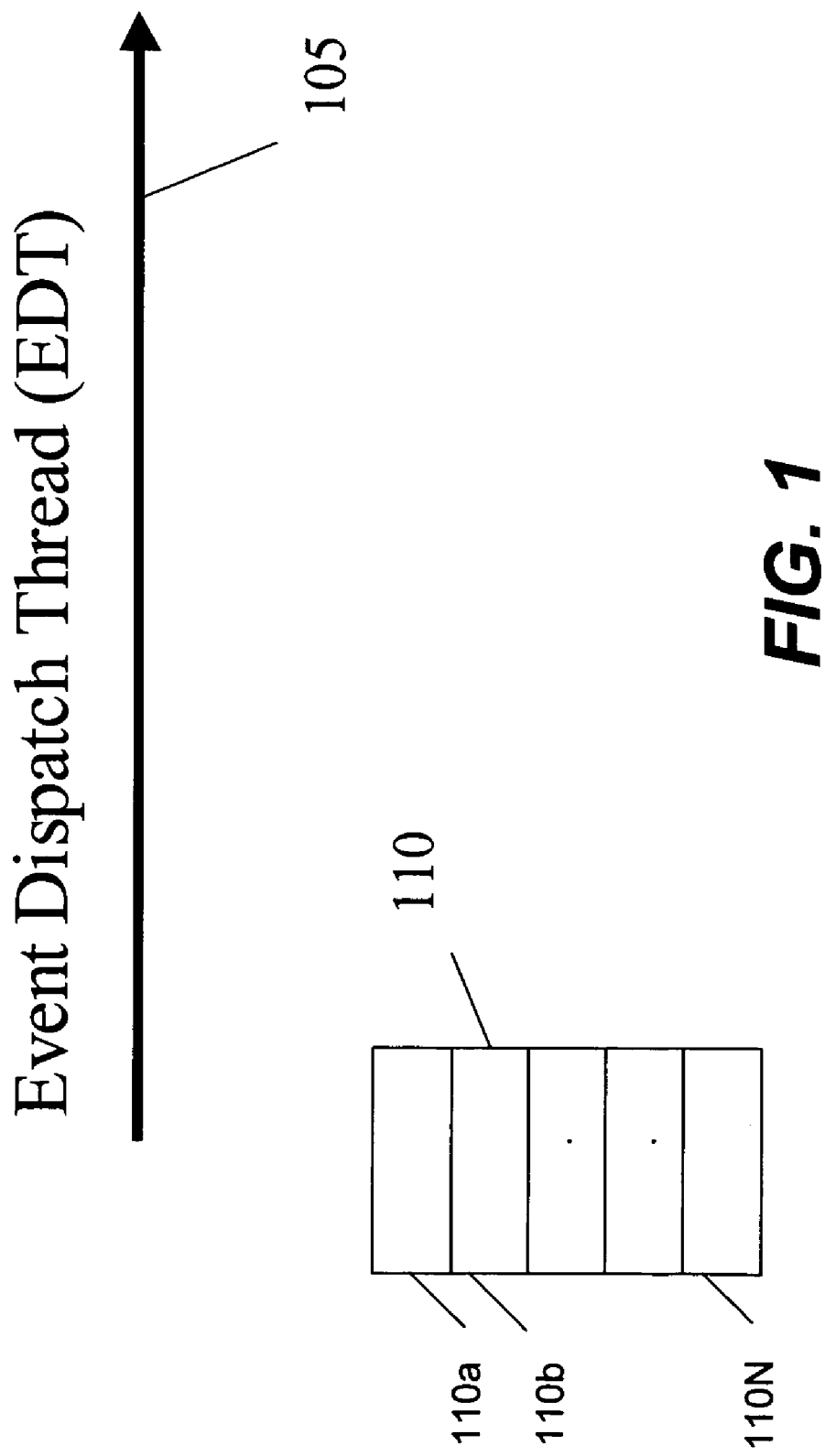
FIG. 1 is a block diagram showing an event dispatch thread, according to one embodiment of the present invention.

FIG. 1 shows a diagram of an event dispatch thread 105, provided in accordance with one embodiment of the present invention. The EDT 105 has an associated event queue 110 implemented as a memory device or other suitable storage medium as will be understood by those skilled in the art. In one example, queue 110 is implemented in a cache memory of a computer system or other data processing apparatus. As described in greater detail below, method calls can be stored and retrieved in queue 110. The EDT 105 retrieves method calls stored in one or more locations in the memory and executes them as events.

In FIG. 1, in one embodiment, the queue 110 includes memory cells 110a-110N. Before method calls are executed on the EDT, they are stored in the cells 110a-110N. Preferably, the queue is provided in a FIFO arrangement. Cell 110a represents the top of the queue 110 from which calls are retrieved and executed one-by-one as events on the EDT 105. Generally the oldest call is situated at the top of queue 110 in cell 110a. A new call, or most recent call, is sent to the bottom of queue 110, in one example, cell 110N.

Embodiments of methods and apparatus of the present invention provide for the efficient transfer of method calls to the EDT. In one embodiment, as shown in the class diagram of FIG. 2, the methods and apparatus are implemented as an API with two classes:

(1) public class Call<V> 120 which implements java.util.concurrent.Callable<V> 125, and (2) public class EDTExecutorService 130 which implements the executor service interface from the java.util.concurrent package, namely java.util.concurrent.ExecutorService 135.

Figure 2:
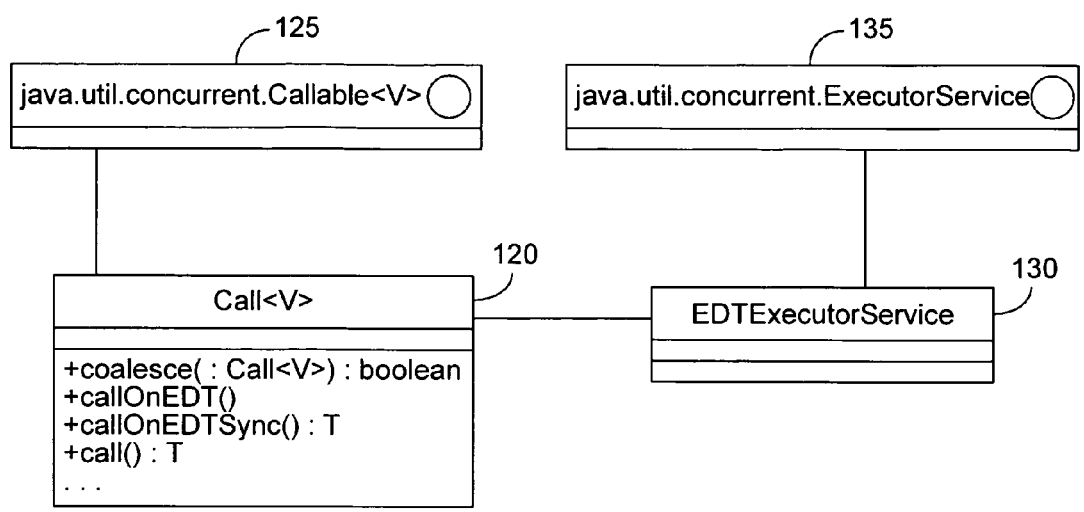
FIG. 2 is a class diagram for an application programming interface (API) that implements embodiments of methods and apparatus of the present invention.

In FIG. 2, Call<V> 120 represents a method call to be executed on the EDT. When the method is to be called, the Call<V> object 120 is created. The Call<V> object encapsulates data describing the call. As shown in FIG. 2, the Call<V> object 120 encapsulates several methods, the operations of which are described below with respect to FIG. 4. These methods include coalesce(:Call<V>), callOnEDT( ), callOnEDTSync( ), and call( ). call( ) is used anytime it is desired to call a method. When it is desired to coalesce two calls, the coalesce(:Call<V>) method is used. Often, subsequent processing varies according to the desired implementation.

In one embodiment, the Call<V> constructor is:

Call(Object callee, Method method, CallProperty callProperty, Object . . . args);

where "callee" is the object to execute the method for, "method" is the method to call, "callProperty" is a coalescing indicator describing whether and how the call could be coalesced, that is, combined with another call, and "args" are parameters, also referred to herein as arguments, for the method invocation. Thus, the class Call<V> has a pointer to the object to call, a pointer to the method to invoke, and parameters to pass.

Embodiments of the present invention provide for a plurality of calls to be coalesced when the calls have the same callee and method. Embodiments of the present invention provide for the calls to be coalesced in several ways. In one embodiment, callProperty governs how the coalescing occurs. In this embodiment, callProperty has one of three values: plain, onlyLast, or coalescing. The value "plain" indicates that the Call cannot be coalesced; "onlyLast" indicates that the Call is to replace a previous call, e.g., for a progress bar or other progress notification for a component; and "coalescing" indicates that the arguments for the Call are to be appended to the arguments for a previous call. Thus, the method can be invoked with a single call, providing the combined set of arguments. The calls can only be coalesced when the calls are for the same callee and for the same method.

In FIG. 2, Call<V> 120 is extendible. The implementation above, using callee, method, and callProperty, is only one of many implementations. This implementation can be changed in many ways as desired. For example, if a particular method call for a certain object is undesirable, the call( ) method can be overridden, as can the coalesce(:Call<V>) method. Extending the Call<V> 120 class enables other operations to be carried out rather than calling the predefined method for the predefined object. In one embodiment, callProperty is used, while other embodiments provide coalescing using different techniques. Also, the Call<V> constructor can be customized as desired for a different implementation to execute code on the EDT. All such alterations and customizations are intended to fall within the spirit and scope of the present invention.

In FIG. 2, the method coalesce is responsible for merging two calls into one, using techniques described herein. When calls are coalesced, the coalesce method returns a value of true. Using the coalesce method, additional types of coalescing can be performed than the particular coalescing operations described herein, within the spirit and scope of the present invention. The coalesce ( ) method can be implemented in many ways, and can be customized as desired for the particular implementation.

In FIG. 2, the EDTExecutorService 130 is a class which submits a call for execution on the EDT. In addition, EDTExecutorService 130 can be used to submit runnables to the EDT. In one example, in which a call is submitted, the method is as follows:

EDTExecutorService.submit(Call call).

The EDTExecutorService class resolves coalescing and ensures that the EDT is not overwhelmed with incoming calls. In one embodiment, time slices are used to implement the EDTExecutorService.

Figure 3:
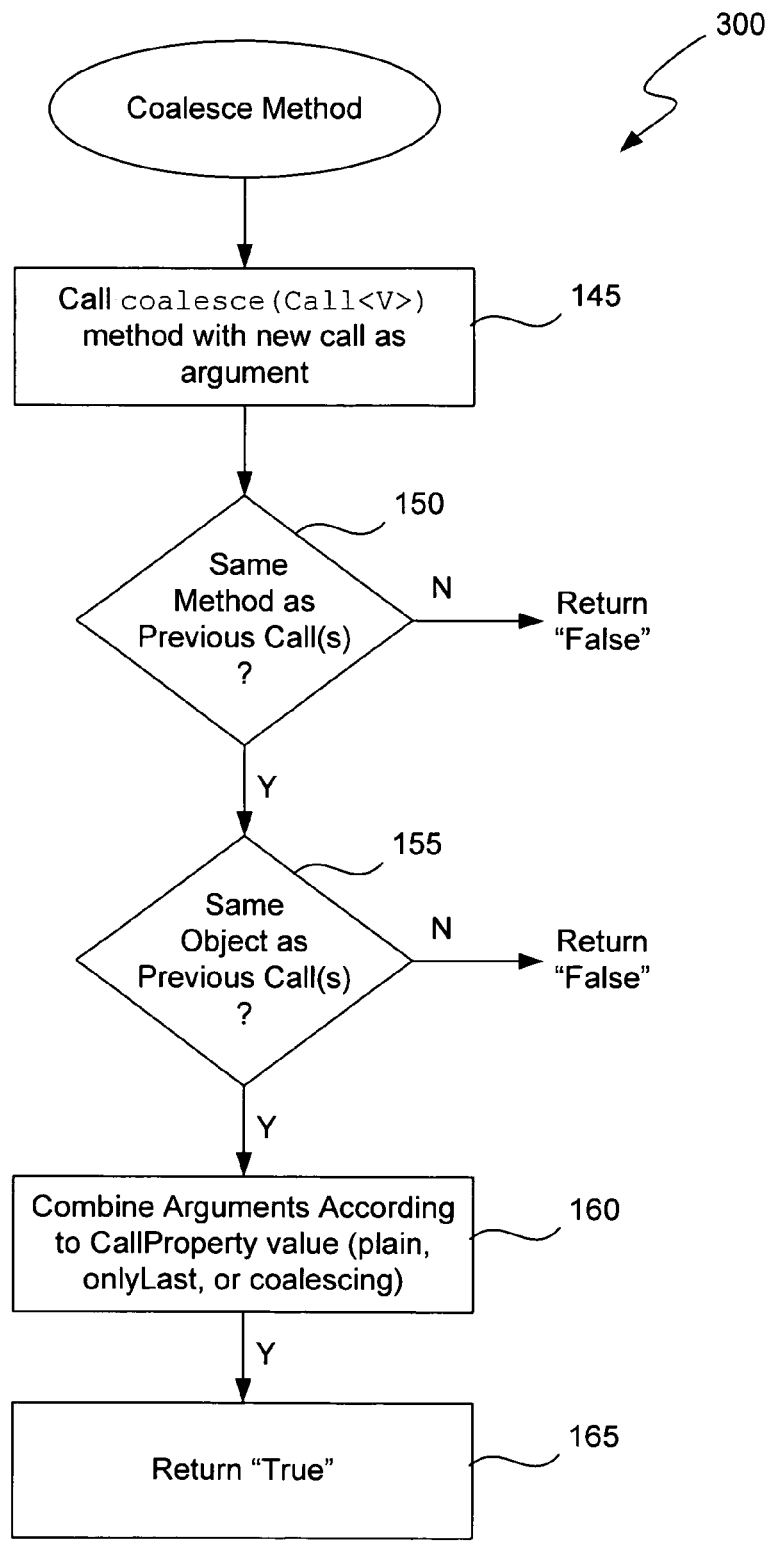
FIG. 3 is a flow diagram showing a method for coalescing method calls, performed in accordance with one embodiment of the present invention.

In FIG. 1, when coalescing is performed on method calls in queue 110, method calls in two or more of cells 110a-N are combined. FIG. 3 shows an example of one coalesce method 400, performed in accordance with embodiments of the present invention.

In FIG. 3, the method 300 begins with calling the coalesce (:Call<V>) method invocation with another call as the argument, in step 145. The supplied method call can be stored as a new call in one of the cells 110a-110N. The coalesce method identifies one or more previous calls already stored in queue 110. When the methods identified by the new call and the previous call(s) are the same, in step 150, and the objects, i.e. callees identified by the object identifiers in the new call and the previous call(s) are the same, in step 155, the arguments in the new call and previous call(s) are combined in step 160. In steps 150 and 155, when either the methods or the identified objects are not the same, the coalesce method returns a value of "False". In step 160, in this embodiment, the arguments are combined according to the callProperty value, as described above. Finally, in step 165, the coalesce method 300 returns a value of "True," as mentioned above.

In FIG. 3, in step 160, when the callProperty value is "plain," the new call is simply added to the bottom of queue 110. When the callProperty value is "onlyLast," the new call replaces a previous call. Or, when the callProperty value is "coalescing," the arguments for the new call are appended to the arguments for the previous call so the coalesced call has the object identifier, method identifier, and combined arguments.

Figure 4:
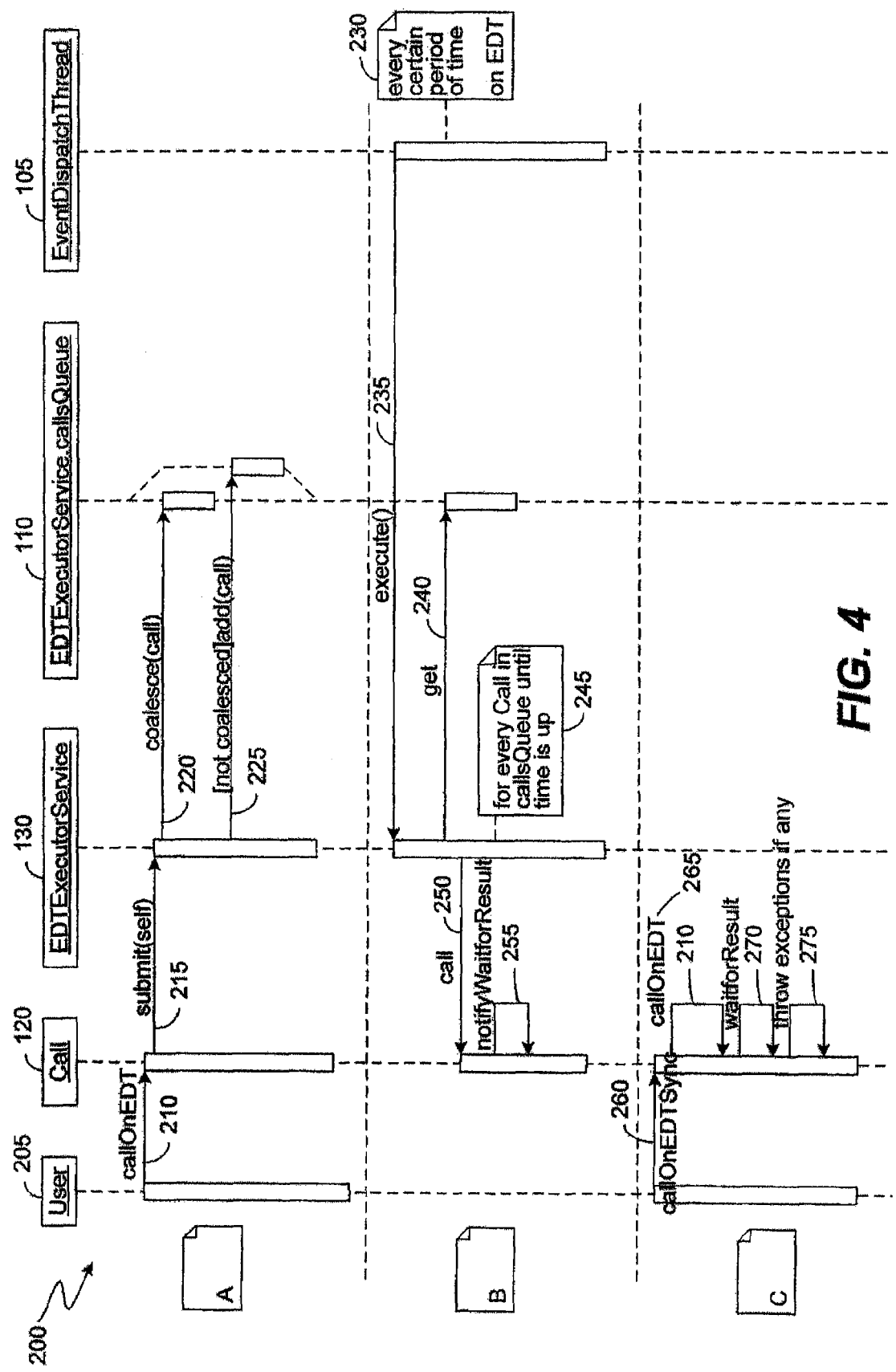
FIG. 4 is a sequence diagram showing a method for transferring a method call to the EDT, performed in accordance with an embodiment of the present invention.

FIG. 4 shows a sequence diagram of a method 200 for transferring a method call to the EDT, performed in accordance with an embodiment of the present invention. Method 200 provides processing steps for the invoke thread putting a call on the queue 110 and, at some later time, the call being picked up on the EDT 105 and executed. In FIG. 4, the method 200 is divided into parts A, B and C. Part A demonstrates placing a call into the queue 110. Part B demonstrates the invoking of calls on the EDT 105, and Part C demonstrates the invocation of calls on the EDT 105 synchronously.

In FIG. 4, part A shows how calls are delivered to the EDT 105. In part A, the method 200 begins with a user 205 identifying a method and an object to call on the EDT 105. In step 210, the callOnEDT method constructs the Call<V> object 120 for this method and object. As mentioned above, the constructor for Call<V> indicates that the identified method is be called for the identified object (i.e., "callee"), indicates how the call can be coalesced (e.g., plain, onlyLast, or coalescing), and passes particular arguments for the method. In step 215, the newly defined call is submitted to the EDTExecutorService 130 using the submit(self) method. The method 200 continues in step 220, when the EDTExecutorService 130 accesses the queue 110, also referred to herein as EDTExecutorService.callsQueue 110, and attempts to coalesce the new call with any previous calls already in the queue 110, using callProperty values as described above. For example, when the callProperty value is "onlyLast," and a previous call is identified having the same method and same object, coalescing involves replacing the previous call with the new call. When the new call is coalesced with any previous calls, processing is complete for part A. When the new call cannot be coalesced, in step 225, the new call is added to the end of queue 110.

In FIG. 4, Part B of method 200 provides for the invoking of calls on the EDT 105, and is initiated on EDT 105. Part B of method 200 happens asynchronously with respect to part A of method 200. A special task 230 is defined to run periodically, each time executing calls from the queue 110. The frequency with which special task 230 runs is preferably often enough so that users do not have to wait for the execution of calls. In this way, freezing is avoided. In one example, 20 times per second is often sufficient, although other frequencies may be used depending on the desired implementation. In step 235, every time the special task 230 runs, the EDT 105 runs an execute( ) method, and a timer is tolled. Responsive to the execute( ) method, in step 240, the EDTExecutorService 130 accesses the queue 110 and gets, i.e., retrieves, calls one-by-one from the queue 110 for execution on the EDT 105. In step 245, retrieved calls are executed in sequence by EDTExecutorService 130 until the timer reaches a predetermined threshold, e.g., 0.045 seconds. When the threshold is exceeded, the execution of calls is postponed until the special task 230 runs again. Subsequent execution by EDTExecutorService 130 begins with the first call from the queue 110.

In FIG. 4, in part B, step 250 involves calling method call on class Call 120. That is, the identified method is called for the identified object passed in the constructor, and passes the arguments, as described above. Lastly, in Part B of method 200, a notifyWaitforResult message is executed in which a notification message is sent to any listeners, indicating whether the new call was executed, in step 255.

In FIG. 4, part C demonstrates the calling of methods synchronously, when it is desirable to wait for a result after calling a method. In part C, the method 200 begins in step 260 with running the method callOnEDTSync, that is, to call the method synchronously. Responsive to callOnEDTSync, in step 265, the method callOnEDT 210 is run, as described above in part A. Then, in step 270, the waitForResult method waits for a result, that is, listens for the notification from step 255 of part B. Any result is provided when the call is executed on the EDT in part B. In step 275, the method 200 proceeds with determining whether any exceptions were thrown when the method was called. When there are exceptions, they are thrown. When no exceptions were thrown, the result is returned to the user.

Many times a UI, including frames, buttons, and other graphical representations, is created on the main thread of an application. When these elements are visible, the properties of these elements cannot be changed from other threads than the EDT. Thus, when it is desirable to call a method which is not thread-safe, including the majority of Swing methods, from any other thread than the EDT, the methods and apparatus described above with respect to FIGS. 1B-1D can be used.

Figure 5:
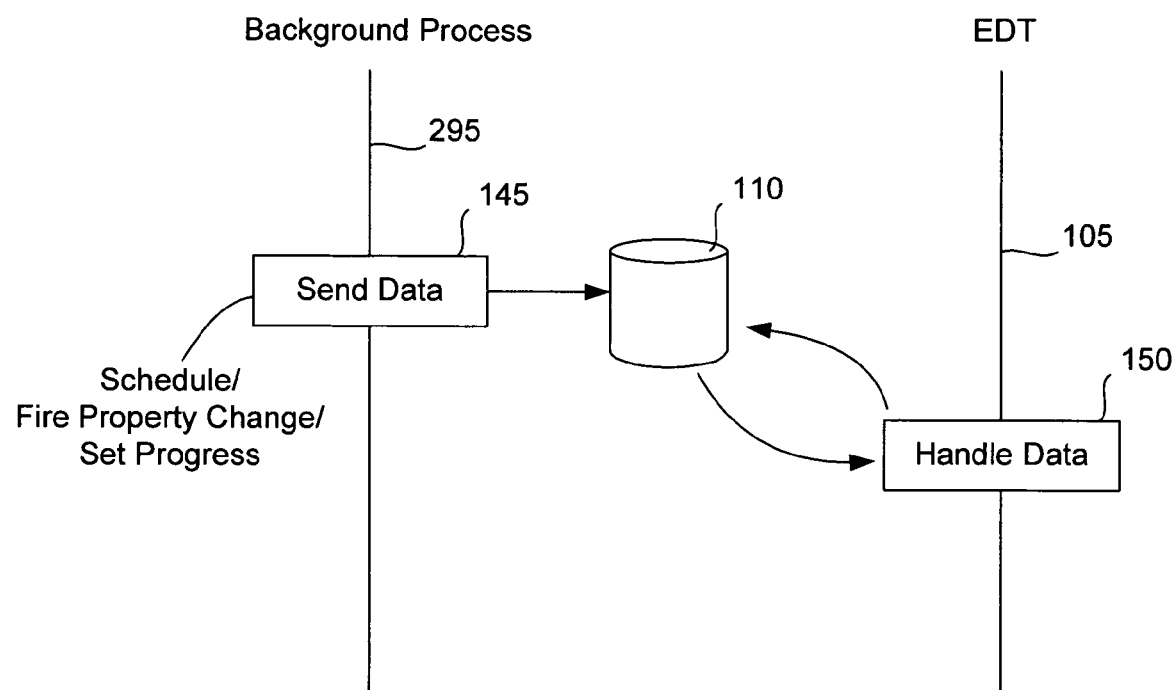
FIG. 5 is a block diagram showing a background process and an event dispatch thread, implementing embodiments of methods and apparatus of the present invention.

FIG. 5 is an illustration of a background process 295 and an EDT 105, implementing embodiments of methods and apparatus of the present invention. The background process 295 represents any application, program, or thread that is executed separate and apart from the EDT 105. In this way, the background process 295 generally does not affect the performance of a UI managed by EDT 105. In FIG. 5, suitable background processes are those that perform time-consuming operations or can otherwise cause freezing, such as the lengthy tasks described above. Examples of background process 295 include user-initiated operations that are time-consuming, such as a program which makes a database request or loads a file in response to the user selecting a menu item.

Embodiments of methods and apparatus of the present invention are used for implementing a new SwingWorker which has several improvements over the original version. These improvements include delivering intermediate results by a Schedule and Consume method, described below, and sharing the state of a process using setProgress and firePropertyChange methods, and a propertyChangeListener method, also described below. In one implementation, these new methods are incorporated as additions to the SwingWorker abstract class, described above, from which a subclass can be defined by a developer to perform GUI-related work in a dedicated thread.

FIG. 5 demonstrates one context for the new SwingWorker methods and apparatus including Schedule, setProgress, and firePropertyChange, performed in accordance with embodiments of the present invention. In one embodiment, novel methods for transferring calls, described above with respect to FIG. 4, are used to provide a framework to implement the novel SwingWorker methods and apparatus.

In FIG. 5, background process 295 and EDT 105 execute independent of one another. That is, background process 295 executes regardless of what is happening on the EDT 105, and is not dependent on any input or other interaction from EDT 105. Similarly, EDT 105 executes regardless of what is happening on the background process 295, and only receives indirect input from the background process 295 through queue 110. At some point during execution of the background process, a Send data operation 145 is called. In one embodiment, the Send data operation 145 is carried out by part A of method 200 for transferring calls, described above with respect to FIG. 4. Examples of Send data operation 145 include the Schedule method, setProgress method, and firePropertyChange method described below. The Send data operation 145 causes method calls to be sent to queue 110 for later retrieval and execution on the EDT 105. Because background process 295 and EDT 105 execute independent of one another, the method calls may be stored in queue 110 for some time until they are retrieved. Those skilled in the art will appreciate that Send data operation 145 may be called multiple times during execution of background process 295.

In FIG. 5, independent of the storing of output method calls in queue 110, at some point during processing on the EDT, a Handle data operation 150 is performed on the EDT. In one embodiment, the Handle data operation 150 is carried out by part B of method 200, described above with respect to FIG. 4. The performing of Handle data operation 150 is controlled by the EDT 105. The Handle data operation 150 retrieves method calls stored in queue 110. The method calls can then be executed on the EDT 105. In instances when the Send data operation 145 includes calling the Schedule method, the Handle data operation 150 includes calling the Consume method for outputting the method calls on the EDT 105. Those skilled in the art will appreciate that Handle data operation 150 may be called multiple times during execution of EDT 105.

In FIG. 5, the retrieving of method calls from queue 110 and outputting of method calls on the EDT 105 when Handle data operation 150 is called happens asynchronously with respect to the sending of method calls to queue 110 during Send data operation 145. That is, there is no relationship between the Send data operation 145 and the Handle data operation 150. The Send data operation 145 is performed according to the schedule determined by background process 295, regardless of when Handle data operation 150 might be performed by EDT 105 or anything else happening on the EDT 105, and is not dependent on any input or other interaction from EDT 105. Similarly, the Handle data operation 150 is performed as determined by EDT 105, regardless of when Send data operation 145 might be performed by background process 295 or anything else happening on the background process 295.

In FIG. 5, in one embodiment, the Send data operation 145 can include any of several methods including a Schedule method, a setProgress method, and a firePropertyChange method. When the Send data operation 145 includes the Schedule method, the Handle data operation 150 generally includes a Consume method. The Schedule method is called on the background process or some thread other than the EDT, and Consume is called on the EDT 105. The Schedule method and Consume method cooperate to prevent the EDT 105 from being overwhelmed by the queuing of method calls for execution, thus making the desired application more responsive. In one embodiment, as described above with respect to FIG. 4, the coalescing of events provides for performing the Handle data operation 150 periodically to retrieve method calls for output on the EDT 105 (e.g., every 50 milliseconds).

In FIG. 5, the Schedule method is called as needed on the background process 295. The background process 295 can be tailored to invoke Schedule as desired to push partial results to the queue 110 for publication on EDT 105. In one embodiment, the Schedule method calls the Consume method, using the above constructor. In FIG. 5, when Send data operation 145 includes calling the Schedule method, the Schedule method call is sent to queue 110 and generally stored in one address, also referred to herein as a cell, described above with respect to FIG. 1.

In FIG. 5, when the Handle data operation 150 is performed, one or more cells 110a-110N starting from the top cell 110a of queue 110 are accessed and the method calls stored therein are retrieved. In one example, when the Handle data operation 150 is the Consume method, the following command is made by the Handle data operation 150:

Consume.invoke(Callee, Args, CallProperty)

In another example, when Consume is an object of type Call<V>, then the arguments needed to execute the call are encapsulated into the object. Thus, the callee, method and arguments are known. In this example, the following command will be used:

Consume.callOnEDT( )

In FIG. 5, the Consume method retrieves method calls from queue 110 and executes or otherwise outputs those method calls on the EDT 105. One example of a scheme for implementing a Consume method is set forth below. In this example, a table.getModel( ) method updates a table displayed on a GUI to include a row of data with the "item" argument. The method is as follows:

// Executed on EDT, receives the data from schedule( )
protected void consume (Item . . . chunks) {
  for (Item item: chunks) {
    table.getModel( ).addRow(item);
  } }

Those skilled in the art will appreciate that the table.getModel( ) method is generally available in Swing.

An additional enhancement of performance is calls "coalescing." Coalescing allows for updating a GUI fewer times than the number of update requests. The combination of calls "scheduling" and "coalescing" improves performance dramatically. Scheduling ensures that the EDT has enough time to handle painting, key events, mouse events, and the like. Coalescing ensures that coalescable GUI updates are accumulated to save the GUI from more frequent updates than necessary.

Generally, coalescing is performed as described above in part A of FIG. 4. With embodiments of the present invention, the coalescing operation can be performed on method calls sent from the background process 295 for output to the EDT 105 at various stages, and by various threads and methods. In one embodiment, the background process 295 performs coalescing of method calls when Send data operation 145 is called. In another embodiment, the Send data operation 145 performs coalescing of method calls as they are stored in queue 110. In another embodiment, a separate coalescing process performs coalescing of method calls before or after they are stored in queue 110. In yet another embodiment, coalescing is performed by Handle data operation 150 when the method calls are retrieved from queue 110.

In another coalescing example, when the Send data operation 145 is a setProgress method, described below, a plurality of cells of the queue 110 identify the setProgress method. In this case, only two cells are relevant: the cell having the most current state information, and the cell having the oldest state information. The difference represent the change in progress. These two cells are selected when the Handle data operation 150 is called, and any intermediate cells are discarded. The arguments in the two selected cells are then provided to the Handle data operation 150.

Figure 6:
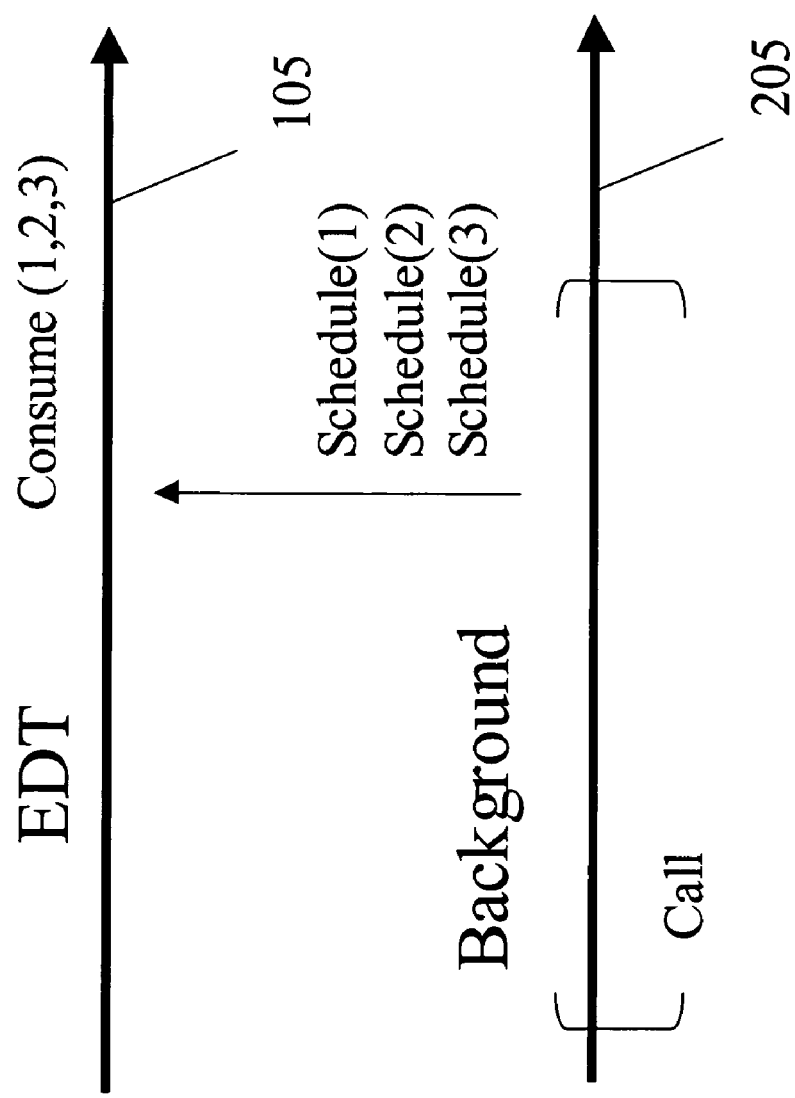
FIG. 6 is a timing diagram showing operation of a Schedule method and a Consume method during processing of a background process and event dispatch thread, according to one embodiment of the present invention.

In FIG. 6, a Schedule method is called at three different times during processing of the background process 295. Each call results in a block 1, 2 and 3 being sent to queue 110 for storage. In this example, these blocks 1, 2 and 3 represent first, second and third partial results and/or the arguments of those results to be output on EDT 105 by the Consume method. But before being output, the coalescing function ensures that what can be coalesced is coalesced. In this example, the identified method and object in the blocks 1, 2 and 3 are all the same, so the three partial results are combined into a combined partial result with the object identifier, method identifier, and combined arguments. That is, arguments passed by multiple Schedule method calls can be executed on the EDT by a single Consume method call in which the arguments are combined, as shown in FIG. 6. In this example, the three schedule operations, Schedule(1), Schedule(2) and Schedule(3) pass arguments 1, 2 and 3 which are coalesced and executed in a single consume operation, Consume(1,2,3). Such coalescing improves computational efficiency, because updating a GUI is generally time consuming. With fewer Consume method calls, the fewer times the GUI needs to be updated, and time and computational resources are conserved.

State information can be updated on the EDT using two other methods when Send data operation 145 is called: firePropertyChange and setProgress. When state information is updated, propertyChange listeners are called on the EDT.

In FIG. 5, the firePropertyChange and setProgress methods have some similar functionality to the Schedule method. The setProgress method is a special case of firePropertyChange. The firePropertyChange method is called when the "bound" property changes for SwingWorker, as known to those skilled in the art and described in java beans documentation for java.beans.PropertyChangeEvent, which is hereby incorporated by reference. A "PropertyChange" event is delivered to the EDT whenever a bean changes a "bound" or "constrained" property. A PropertyChangeEvent object is sent as an argument to PropertyChangeListener and VetoableChangeListener methods. Normally, PropertyChangeEvents are accompanied by the name and the old and new value of the changed property. If the new value is a primitive type (such as int or boolean), the new value must be wrapped as the corresponding java.lang.* Object type (such as Integer or Boolean).

The setProgress method is a special case because it is known that calls can be coalesced for the progress. The setProgress and firePropertyChange methods call propertyChangeListeners with the PropertyChangeEvent object.

A process can have many 'bounding' properties. Progress is one of them. For example, when a lengthy task accesses a website, the bounding property might be the status of such connection. The firePropertyChange method would be called to update listeners on the property value.

In FIG. 5, when calling the Send data operation 145 includes calling of firePropertyChange or setProgress, an object, method identifier, and arguments are passed to the queue 110 and stored in a memory cell. In these situations, the method identified by the method identifier is either "firePropertyChange" or "setProgress." The differences are that while the Schedule method passes partial results, the firePropertyChange and setProgress methods pass state information. The state information generally includes information representing the progress of one or more threads or processes. Another difference is that the schedule method essentially notifies the Consume method, while firePropertyChange and setProgress notify propertyChange listeners. In addition, while the Consume method is essentially part of the EDT, listeners can be external to the process or invoked on the EDT as well. In one embodiment, calling of the firePropertyChange or setProgress method on the background process triggers propertyChange listeners invocation on the EDT.

In one example, a setProgress counter displayed on a GUI is incremented every time a new item is loaded and displayed. Listeners on the EDT are notified that the setProgress counter has changed. Other examples of how setProgress can be used include the progress bar 615 and the pie-shaped progress circle 620 in the GUI 600 of FIG. 7.

The Consume method and setProgress method both provide coalescing. In the Consume method, coalescing includes joining arguments, as described above. With the setProgress method, the oldest state and the current state are retrieved for an object indicating progress of some operation. In one example, a progress object has a value from 0 to 100 indicating an estimated percentage of completion of the operation. 0 indicates that no progress has been made, and 100 indicates that the operation has been completed. So, for example, when the current state is setProgress(30), the user can receive this value and not have to bother with out-of-date state information such as setProgress(20) or setProgress(10).

FirePropertyChange is a method used for disclosing a property which a process in progress may have. A process can have many different properties, e.g., last username and password, how much memory used, internal cache state, etc. The properties are essentially anything internal to the background process. FirePropertyChange indicates that the property was changed. For instance, a button on the GUI can indicate status information (e.g., "connection open," "connection closed," "connection refused"). Partial results can also be handled by FirePropertyChange.

Figure 7:
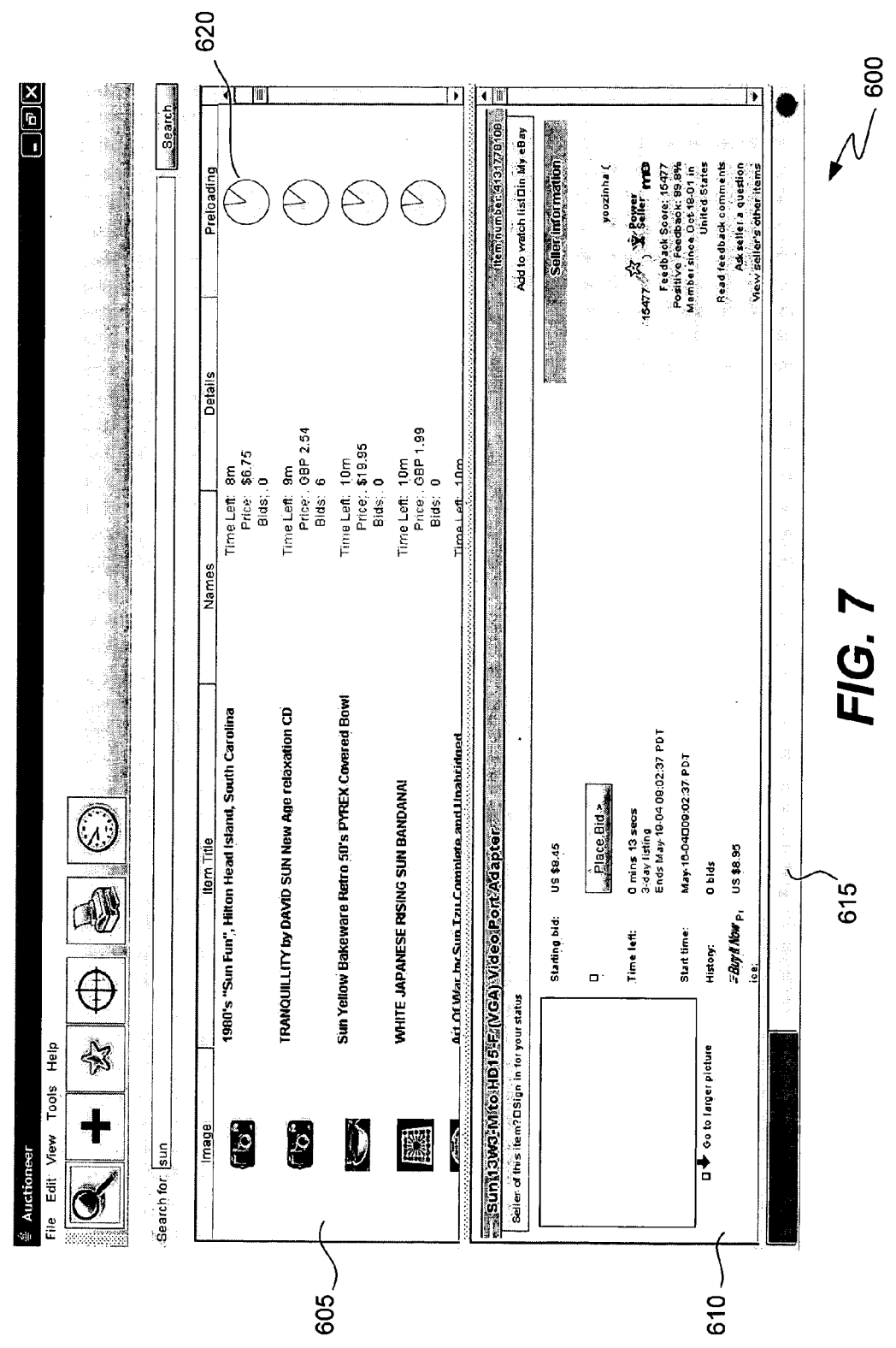

In one example, as shown in the GUI of FIG. 7, an HTML page 600 is loaded for display by a browser. In a first portion 605 of the GUI, a table has rows or paragraphs displaying a plurality of items submitted for auction. Each item has an image, a title, a name, and detailed information, which are provided as partial results. In a second portion 610 of the screen, detailed information describing a particular item is shown when that item is selected. When the HTML page is loaded for display by the browser, the page is loaded paragraph-by-paragraph. Each paragraph can be pushed to the GUI to display, however, such pushing could cause too many events to be queued by the EDT, resulting in freeze. Instead, the Schedule and Consume methods are used, as described above, to provide the images, text and other individual data objects within each paragraph as partial results. The Consume method outputs the items on the EDT for display on the GUI as soon as reasonably possible, when Handle data operation 150 is called.

Also in FIG. 7, a setProgress method tracks the progress of the data loading and updates the GUI, in particular, a progress bar 615 shown at the bottom of the GUI. The progress bar 615 shows progress of the background process of loading the entire page from the Internet. The setProgress method updates the progress bar 615 every time a new item is received and displayed in the table shown in the first portion 605 of the GUI. A second setProgress method updates pie-shaped progress circle 620 indicating the progress of downloading all of the items in a particular row, in this case, associated with a particular auction item. The pie-shaped progress circle 620 serves as a "preloading" indicator for each auction item, indicating the status of the loading of data describing that item.

In FIG. 7, embodiments of methods and apparatus of the present invention provide increased responsiveness and a more real-time experience as opposed to conventional applications which wait until all items are loaded, and then show the entire GUI in one shot as a final result. By providing partial results and state information, the methods and apparatus described herein provide a more responsive GUI for the user.

In FIG. 7, in one embodiment, each of four rows of information in first portion 605 is passed as a separate argument of a respective Schedule method call. At some later time, the Consume method is called on the EDT. Using the coalescing techniques described above, the arguments are displayed on the GUI with a single call to the Consume method.

In FIG. 7, in a preferred embodiment, there are a plurality of SwingWorkers in operation. The SwingWorkers cooperate to split an otherwise complicated process into simpler and manageable pieces. One SwingWorker is responsible for loading tabular data for the items Table. The others are responsible for prefetching html documents for visible items in the table. When item becomes invisible, the prefetching process for this item is canceled. Thus, for example, the user might click on a visible item to get more details on it in html format. If this data is prefetched, the result will be instant. Thus, the user experience is improved. An otherwise time consuming operation becomes an almost instant result using SwingWorker.

Other applications in which embodiments of methods and apparatus of the present invention can be used include table display applications, such as financial applications. In one example, stock quotes and other partial results are loaded at regular intervals from the Internet, and the UI is responsive by updating a table in which the quotes are displayed. The table is updated so that the stock quotes are displayed shortly after being received.

Figure 8:
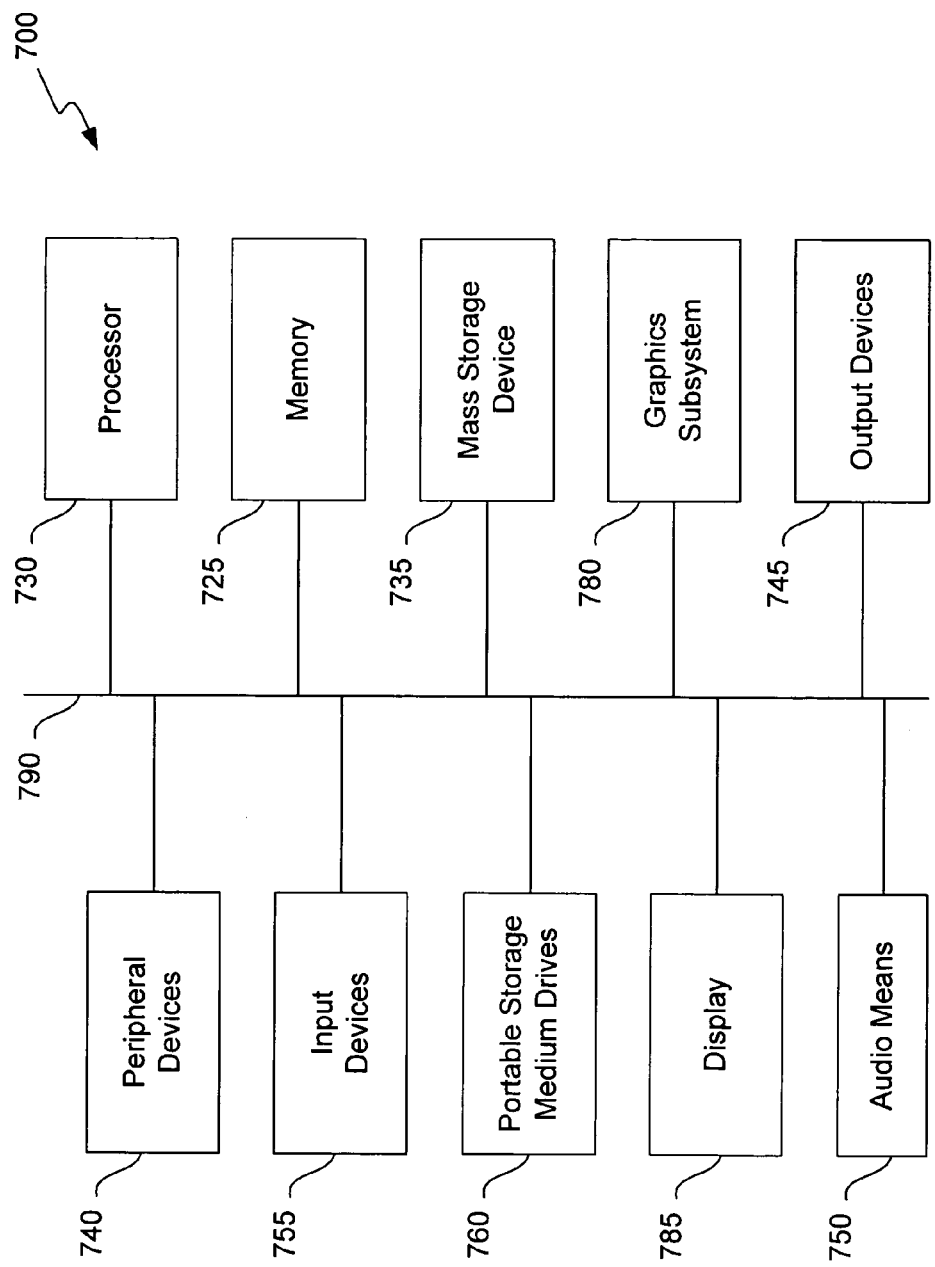
FIG. 8 is a block diagram of a computer system or data processing apparatus 700 used for performing methods in accordance with embodiments of the present invention.

FIG. 8 is a block diagram of a computer system 700, also referred to herein as a data processing apparatus 700, used for performing methods described herein. The computer system 700 includes a processor 730 for executing program instructions stored in a memory 725. In some embodiments, processor 730 includes a single microprocessor, while in others, processor 730 includes a plurality of microprocessors to define a multi-processor system. The memory 725 stores instructions and data for execution by processor 730, including instructions and data for performing the methods described above. Depending on the extent of software implementation in computer system 700, the memory 725 stores executable code when in operation. The memory 725 includes, for example, banks of read-only memory (ROM), dynamic random access memory (DRAM) as well as high-speed cache memory.

In FIG. 8, within computer system 700, an operating system comprises program instruction sequences. The operating system provides a software platform upon which application programs may execute, in a manner readily understood by those skilled in the art. The computer system 700 further comprises one or more applications having program instruction sequences for performing the methods described above.

In FIG. 8, the computer system 700 incorporates any combination of additional devices. These include, but are not limited to, a mass storage device 735, one or more peripheral devices 740, an audio means 750, one or more input devices 755, one or more portable storage medium drives 760, a graphics subsystem 780, a display 785, and one or more output devices 745. The various components are connected via an appropriate bus 790 as known by those skilled in the art. In alternative embodiments, the components are connected through other communications media known in the art. In one example, processor 730 and memory 725 are connected via a local microprocessor bus; while mass storage device 735, peripheral devices 740, portable storage medium drives 760, and graphics subsystem 780 are connected via one or more input/output buses.

In FIG. 8, mass storage device 735 is implemented as fixed and/or removable media, for example, as a magnetic, optical, or magneto-optical disk drive. The drive is preferably a nonvolatile storage device for storing data and instructions for use by processor 730. In some embodiments, mass storage device 735 stores client and server information, code for carrying out methods in accordance with exemplary embodiments of the invention, and computer instructions for processor 730. In other embodiments, computer instructions for performing methods in accordance with exemplary embodiments of the invention also are stored in processor 730. The computer instructions are programmed in a suitable language such as Java or C++.

In FIG. 8, the portable storage medium drive 760, in some embodiments, operates in conjunction with a portable nonvolatile storage medium, such as a floppy disk, CD-ROM, or other computer-readable medium, to input and output data and code to and from the computer system 700. In some embodiments, methods performed in accordance with exemplary embodiments of the invention are implemented using computer instructions that are stored on such a portable medium and input to the computer system 700 via portable storage medium drive 760.

In FIG. 8, the peripheral devices 740 include any type of computer support device, such as an input/output (I/O) interface, to add functionality to computer system 700. In one example, the peripheral devices include a network interface card for interfacing to a network, a modem, and the like. The peripheral devices also include input devices to provide a portion of a user interface and may include an alphanumeric keypad or a pointing device such as a mouse, a trackball, a stylus, or cursor direction keys. The I/O interface comprises conventional circuitry for controlling input devices and performing particular signal conversions upon I/O data. The I/O interface may include, for example, a keyboard controller, a serial port controller, and/or digital signal processing circuitry.

In FIG. 8, the graphics subsystem 780 and the display 785 provide output alternatives of the system. The graphics subsystem 780 and display 785 include conventional circuitry for operating upon and outputting data to be displayed, where such circuitry preferably includes a graphics processor, a frame buffer, and display driving circuitry. The display 785 may include a cathode ray tube (CRT) display, a liquid crystal display (LCD), or other suitable devices. The display 785 preferably can display at least 256 colors. The graphics subsystem 780 receives textual and graphical information and processes the information for output to the display 785, often as a GUI. A video card in the computer system 700 also comprises a part of graphics subsystem 780 and also preferably supports at least 256 colors. For optimal results in viewing digital images, the user should use a video card and monitor that can display the True Color (24 bit color) setting. This setting enables the user to view digital images with photographic image quality.

In FIG. 8, audio means 750 preferably includes a sound card that receives audio signals from a peripheral microphone. In addition, audio means 750 may include a processor for processing sound. The signals can be processed by the processor in audio means 750 of computer system 700 and passed to other devices as, for example, streaming audio signals. In some embodiments, programs for performing methods in accordance with exemplary embodiments of the invention are embodied as computer program products. These generally include a storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card, smart card, and other media.

Stored on one or more of the computer readable media, the program includes software for controlling both the hardware of a general purpose or specialized computer or microprocessor. This software also enables the computer or microprocessor to interact with a human or other mechanism utilizing the results of exemplary embodiments of the invention. Such software includes, but is not limited to, device drivers, operating systems and user applications. Preferably, such computer readable media further include software for performing the methods described above.

In certain other embodiments, a program for performing an exemplary method of the invention or an aspect thereof is situated on a carrier wave such as an electronic signal transferred over a data network, as one form of a computer program product. Suitable networks include the Internet, a frame relay network, an ATM network, a wide area network (WAN), or a local area network (LAN). Those skilled in the art will recognize that merely transferring the program over the network, rather than executing the program on a computer system or other device, does not avoid the scope of the invention.

Figure 9:
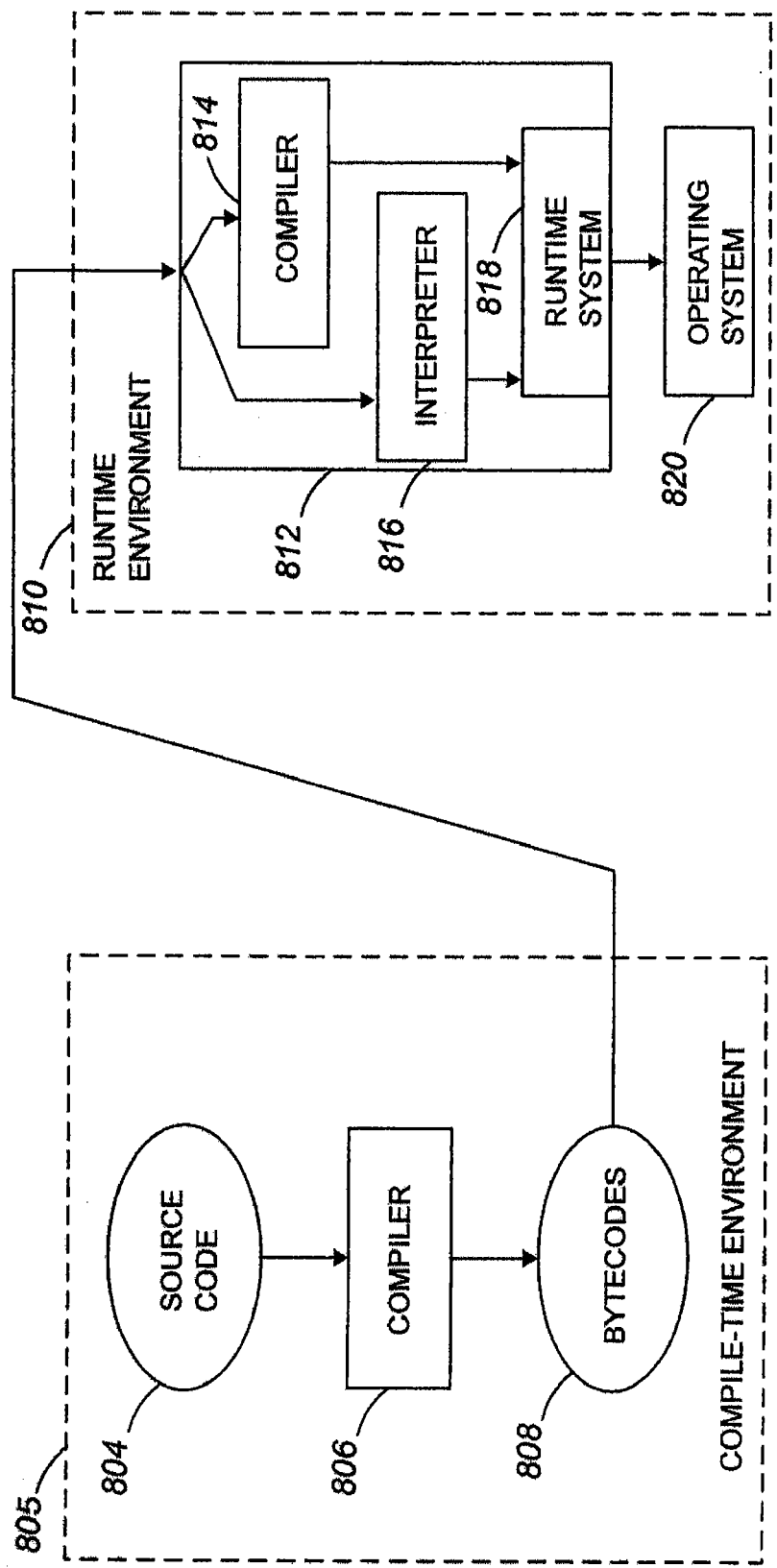
FIG. 9 is a diagrammatic representation of a virtual machine suitable for implementing embodiments of methods and apparatus of the present invention.

FIG. 9 is a diagrammatic representation of a virtual machine suitable for implementing embodiments of methods and apparatus of the present invention. When a computer program, e.g., a computer program written in the Java™ programming language, is executed, source code 804 is provided to a compiler 806 within compile-time environment 805. Compiler 806 translates source code 804 into bytecodes 808. In general, source code 804 is translated into bytecodes 808 at the time source code 804 is created by a software developer.

In FIG. 9, bytecodes 808 may generally be reproduced, downloaded, or otherwise distributed through a network or stored on a storage device. In the described embodiment, bytecodes 808 are platform independent. That is, bytecodes 808 may be executed on substantially any computer system that is running on a suitable virtual machine 812. Bytecodes 808 are provided to a runtime environment 810 which includes virtual machine 812. Runtime environment 810 may generally be executed using a processor or processors. Virtual machine 812 includes a compiler 814, an interpreter 816, a runtime system 818, and an operating system 820. Bytecodes 808 may be provided either to compiler 814 or interpreter 816.

In FIG. 9, when bytecodes 808 are provided to compiler 814, methods contained in bytecodes 808 are compiled into machine instructions. In one embodiment, compiler 814 is a just-in-time compiler which delays the compilation of methods contained in bytecodes 808 until the methods are about to be executed. When bytecodes 808 are provided to interpreter 816, bytecodes 808 are read into interpreter 816 one bytecode at a time. Interpreter 816 then performs the operation defined by each bytecode as each bytecode is read into interpreter 816. That is, interpreter 816 "interprets" bytecodes 808, as will be appreciated by those skilled in the art. In general, interpreter 816 processes bytecodes 808 and performs operations associated with bytecodes 808 substantially continuously.

In FIG. 9, when a method is invoked by another method, or is invoked from runtime environment 810, if the method is interpreted, runtime system 818 may obtain the method from runtime environment 810 in the form of a sequence of bytecodes 808, which may be directly executed by interpreter 816. If, on the other hand, the method which is invoked is a compiled method which has not been compiled, runtime system 818 also obtains the method from runtime environment 810 in the form of a sequence of bytecodes 808, then may go on to activate compiler 814. Compiler 814 then generates machine instructions from bytecodes 808, and the resulting machine-language instructions may be executed directly by one or more processors. In general, the machine-language instructions are discarded when virtual machine 812 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

A number of implementations of the invention have been described. Nevertheless, it will be understood that various modifications may be made without departing from the spirit and scope of the invention. Accordingly, other embodiments are within the scope of the following claims.

What is claimed is:

1. A method for transferring a method call from an invoke thread to an event dispatch thread, the invoke thread and the event dispatch thread executing independent of one another, the event dispatch thread having an associated queue, the method comprising the steps of:
   defining a new call on the invoke thread, the new call including:
      i) identification of a method,
      ii) identification of an object,
      iii) one or more arguments, and
      iv) a coalescing indicator indicating a type of coalescing for the call;
   sending, during execution of the invoke thread, the new call to the queue, one or more previous calls being stored in the queue;
   coalescing the new call with one of the previous calls in the queue according to the type of coalescing indicated by the coalescing indicator;
   retrieving the coalesced new call from the queue; and
   executing the retrieved call as an event on the event dispatch thread including calling the identified method for the identified object and passing the one or more arguments.

2. The method claim 1, further comprising the step of:
   outputting a notification message, responsive to executing the retrieved call on the event dispatch thread.

3. The method of claim 1, wherein the step of defining the new call includes:
   providing a call constructor identifying the method, the object, the one or more arguments, and the coalescing indicator.

4. The method of claim 1, wherein the step of coalescing the new call with the one previous call includes:
   determining that the new call and the one previous call identify the same object and the same method.

5. The method of claim 1, wherein the coalescing indicator indicates that the new call is to replace the one or more previous calls, and the step of coalescing the new call with the one previous call includes:
   replacing the one previous call in the queue with the new call.

6. The method of claim 1, wherein the coalescing indicator indicates that the one or more arguments of the new call are to be appended to an argument of the one previous call, and the step of coalescing the new call with the one previous call includes:
   appending the one or more arguments of the new call to the argument of the one previous call in the queue.

7. The method of claim 1, further comprising the steps of:
   retrieving calls from the queue; and
   executing the retrieved calls in sequence as events on the event dispatch thread.

8. The method of claim 7, wherein the step of retrieving calls is performed asynchronously with respect to the step of sending the new call to the queue.

9. The method of claim 7, wherein the step of retrieving calls is performed synchronously with respect to the step of sending the new call to the queue.

10. The method of claim 7, wherein the step of retrieving calls from the queue is performed periodically.

11. The method of claim 1, wherein the coalescing is performed when the method calls are retrieved from the queue.

12. A data processing apparatus comprising:
   a memory storing a method transfer program for transferring a method call from an invoke thread to an event dispatch thread, the invoke thread and the event dispatch thread executing independent of one another, the event dispatch having an associated queue, the method transfer program:
   defining a new call on the invoke thread, the new call including:
      i) identification of a method,
      ii) identification of an object,
      iii) one or more arguments, and
      iv) a coalescing indicator indicating a type of coalescing for the call;
   sending, during execution of the invoke thread, the new call to the queue, one or more previous calls being stored in the queue, and coalescing the new call with one of the previous calls in the queue according to the type of coalescing indicated by the coalescing indicator;
   retrieving the coalesced new call from the queue;
   executing the retrieved call as an event on the event dispatch thread, including calling the identified method for the identified object and passing the one or more arguments; and
   a processor capable of running the method transfer program.

13. The data processing apparatus of claim 12, wherein coalescing the new call with the one previous call includes:
   determining that the new call and the one previous call identify the same object and the same method.

14. The data processing apparatus of claim 12, wherein the coalescing indicator indicates that the new call is to replace the one or more previous calls, and coalescing the new call with the one previous call includes:
   replacing the one previous call in the queue with the new call.

15. The data processing apparatus of claim 12, wherein the coalescing indicator indicates that the one or more arguments of the new call are to be appended to an argument of the one previous call, and coalescing the new call with the one previous call includes:
   appending the one or more arguments of the new call to the argument of the one previous call in the queue.

16. The data processing apparatus of claim 12, the method transfer program further: retrieving calls from the queue; and
   executing the retrieved calls in sequence as events on the event dispatch thread.

17. The data processing apparatus of claim 12, wherein retrieving calls is performed asynchronously with respect to sending the new call to the queue.

18. The data processing apparatus of claim 12, wherein retrieving calls is performed synchronously with respect to sending the new call to the queue.

19. A tangible storage medium comprising a computer program product comprising instructions operable to cause a data processing apparatus to perform a method for transferring a method call from an invoke thread to an event dispatch thread, the invoke thread and the event dispatch thread executing independent of one another, the event dispatch having an associated queue, the method comprising the steps of:

defining a new call on the invoke thread, the new call including:
    i) identification of a method,
    ii) identification of an object,
    iii) one or more arguments, and
    iv) a coalescing indicator indicating a type of coalescing for the call;
  sending, during execution of the invoke thread, the new call to the queue, one or more previous calls being stored in the queue;
  coalescing the new call with one of the previous calls in the queue according to the type of coalescing indicated by the coalescing indicator;
  retrieving the coalesced new call from the queue; and
  executing the retrieved call as an event on the event dispatch thread, including calling the identified method for the identified object and passing the one or more arguments.

20. An apparatus for transferring a method call from an invoke thread to an event dispatch thread, the invoke thread and the event dispatch thread executing independent of one another, the event dispatch having an associated queue, the apparatus comprising:

a processor;
  means for defining a new call on the invoke thread, the new call including:
    i) identification of a method,
    ii) identification of an object,
    iii) one or more arguments, and
    iv) a coalescing indicator indicating a type of coalescing for the call;
  means for sending, during execution of the invoke thread, the new call to the queue, one or more previous calls being stored in the queue;
  means for coalescing the new call with one of the previous calls in the queue according to the type of coalescing indicated by the coalescing indicator;
  means for retrieving the coalesced new call from the queue; and
  means for executing the retrieved call as an event on the event dispatch thread, including calling the identified method for the identified object and passing the one or more arguments.

* * * * *